US011136976B2

(12) United States Patent
Gerlach et al.

(10) Patent No.: US 11,136,976 B2
(45) Date of Patent: Oct. 5, 2021

(54) HYDRAULIC MACHINE INCLUDING AN IMPROVED BRAKING SYSTEM

(71) Applicant: POCLAIN HYDRAULICS INDUSTRIE, Verberie (FR)

(72) Inventors: Carsten Gerlach, Verberie (FR); Jens Hinze, Verberie (FR); Jörg Marks, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 102 days.

(21) Appl. No.: 16/174,512

(22) Filed: Oct. 30, 2018

(65) Prior Publication Data

US 2019/0128259 A1  May 2, 2019

(30) Foreign Application Priority Data

Nov. 2, 2017 (FR) ..................... 1760319

(51) Int. Cl.
*F04C 15/00* (2006.01)
*F03C 1/04* (2006.01)
(Continued)

(52) U.S. Cl.
CPC .......... *F04C 15/0084* (2013.01); *F03C 1/047* (2013.01); *F03C 1/0431* (2013.01);
(Continued)

(58) Field of Classification Search
CPC ............ F04B 1/04–0478; F04B 1/0443; F16D 55/40; F16D 2121/06; F16D 2127/02; F16D 2129/02; F04C 15/0084; F03C 1/0431
(Continued)

(56) References Cited

U.S. PATENT DOCUMENTS 5,333,705 A * 8/1994 Lemaire ................ F03C 1/0447
188/170
6,357,558 B1  3/2002 Case et al.
(Continued)

FOREIGN PATENT DOCUMENTS

EP  1154170 A1  11/2001
FR  2579281 A1  9/1986
(Continued)

OTHER PUBLICATIONS

"Fundamentals of Hydraulic Motors"; Hydraulics & Pneumatics; Jun. 26, 2014; https://www.hydraulicspneumatics.com/technologies/hydraulic-pumps-motors/article/21884401/fundamentals-of-hydraulic-motors (Year: 2014).*

*Primary Examiner* — Alexander B Comley
(74) *Attorney, Agent, or Firm* — The Webb Law Firm

(57) ABSTRACT

A hydraulic machine including: a casing rotatably mounted relative to a shaft; first brake means constrained to rotate with the casing; second brake means constrained to rotate with the shaft, and adapted to co-operate with the first brake means; a braking piston associated with return means and tending to exert a braking force; and a brake-release chamber adapted to be connected to a pressure force so as to apply a brake-release pressure selectively to the braking piston, so as to enable the first and second brake means to be separated; said hydraulic machine including a sweeping channel arranged in the shaft so as to define a leakage flow between the brake-release chamber and an internal volume of the casing.

10 Claims, 3 Drawing Sheets

(51) Int. Cl.
  *F04B 1/047*   (2020.01)
  *F16D 55/40*   (2006.01)
  *F16D 129/02*  (2012.01)
  *F16D 121/06*  (2012.01)
  *F16D 127/02*  (2012.01)
  *F03C 1/047*   (2006.01)
  *F04B 1/1071*  (2020.01)
  *F04B 1/0443*  (2020.01)

(52) U.S. Cl.
  CPC ............ *F04B 1/047* (2013.01); *F04B 1/1071* (2013.01); *F16D 55/40* (2013.01); *F04B 1/0443* (2013.01); *F16D 2121/06* (2013.01); *F16D 2127/02* (2013.01); *F16D 2129/02* (2013.01)

(58) Field of Classification Search
  USPC .......................................................... 91/491
  See application file for complete search history.

(56) References Cited

U.S. PATENT DOCUMENTS

| | | |
|---|---|---|
| 6,585,088 B1 | 7/2003 | Fontaine et al. |
| 6,594,993 B1 * | 7/2003 | Friedrichsen ........... B60T 1/062 60/442 |
| 8,662,259 B2 | 3/2014 | Vidal et al. |

FOREIGN PATENT DOCUMENTS

| | | | |
|---|---|---|---|
| FR | 2796886 A1 | 2/2001 | |
| FR | 2958986 A1 | 10/2011 | |

* cited by examiner

HYDRAULIC MACHINE INCLUDING AN IMPROVED BRAKING SYSTEM

CROSS-REFERENCE TO RELATED APPLICATION

This application claims priority to French Patent Application No. 1760319 filed Nov. 2, 2017, the disclosure of which is hereby incorporated in its entirety by reference.

FIELD OF THE INVENTION

The present invention relates to the field of brakes for hydraulic machines.

STATE OF THE PRIOR ART

Hydraulic machines commonly need to be swept with oil in order to provide cooling and lubrication for various elements, in particular the elements of the motor portion or the pump portion, and also to ensure proper operation. The term "flushing" is used to mean that oil is caused to circulate within the casing.

Such flushing is typically performed via a dedicated hydraulic circuit, thereby making the structure of the hydraulic system more complex.

SUMMARY OF THE INVENTION

The present disclosure provides a hydraulic machine comprising:
a casing rotatably mounted relative to a shaft;
a cylinder block provided with a plurality of pistons arranged in an internal volume of the casing;
first brake means constrained to rotate with the casing;
second brake means constrained to rotate with the shaft, and adapted to co-operate with the first brake means;
a braking piston adapted to act on the first brake means, said braking piston being associated with return means tending to exert a force on the braking piston tending to act on the first and/or second brake means so as to put them into contact; and
a brake-release chamber adapted to be connected to a pressure force so as to apply a brake-release pressure selectively to the braking piston, thereby tending to oppose the force applied by the return means on the braking piston, so as to enable the first and second brake means to be separated;
said braking device being characterized in that a flushing channel is arranged in the shaft so as to define a leakage flow between the brake-release chamber and an internal volume of the brake casing.

In an example, the flushing channel is provided with a constriction typically defining some minimum pressure in the brake-release chamber.

In an example, the flushing channel is provided with a check valve.

Optionally, the return means are configured so that above a pressure within the brake-release chamber that is above a first pressure threshold value, the first brake means and the second brake means are disengaged, and said check valve is rated to a rating value that is strictly greater than said first pressure threshold value.

In an example, said machine is a hydraulic machine with radial pistons comprising a cylinder block having a plurality of pistons arranged radially around an axis of rotation and arranged facing a multi-lobe cam.

In an example, said system further comprises an admission orifice leading into the brake-release chamber, the admission orifice being for connection to a pressure source.

In an example, the shaft is made up of two portions, respectively a proximal portion and a distal portion, and the flushing channel leads into a flushing chamber arranged between the proximal portion and the distal portion of the shaft.

In a variant, the flushing channel leads radially into a chamber formed between a distributor valve of the hydraulic machine and the shaft.

In an example, the flushing channel opens into the brake-release chamber at one end of the shaft.

In a variant, the flushing channel opens out radially into the brake-release chamber in a flushing cavity formed at one end of the first and second brake means in an axial direction of the shaft.

BRIEF DESCRIPTION OF THE DRAWINGS

The invention and its advantages can be better understood on reading the following detailed description of various embodiments of the invention given as non-limiting examples. The description refers to the sheets of the accompanying figures, in which.

Elements in common in the figures are designated in all of them by the same numerical references.

DETAILED DESCRIPTION OF EMBODIMENTS

Figure 1:
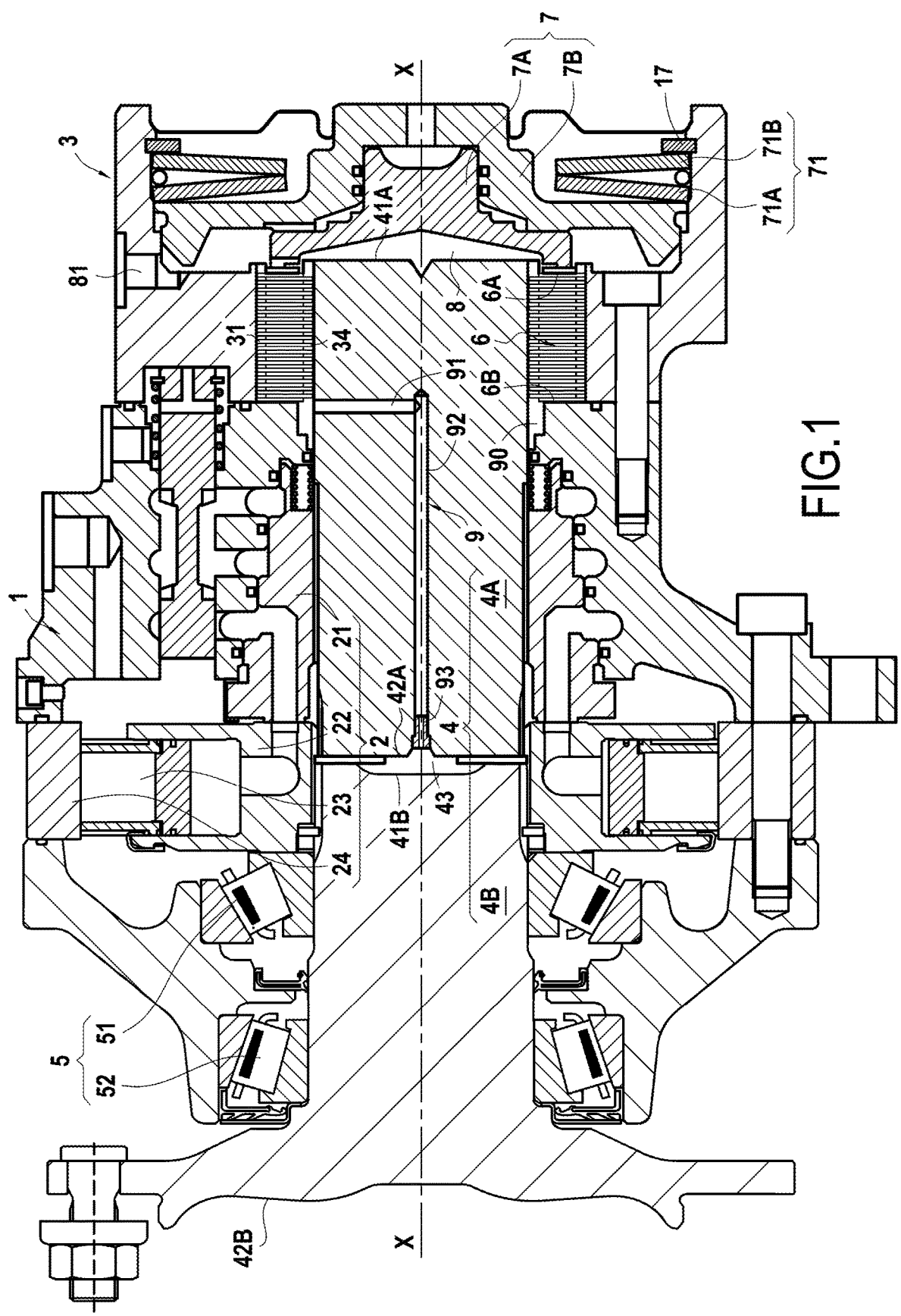
FIG. 1 shows a system including a braking device in an aspect of the invention, associated with a hydraulic machine.

FIG. 1 is a diagrammatic section view of an assembly in an aspect of the invention.

This figure shows an assembly comprising a casing 1 having arranged therein a hydraulic machine 2 and a braking system 3.

A shaft 4 is engaged in the casing 1, and is connected to the casing via a bearing 5 made up of two rolling bearing elements. The shaft 4 defines an axis of rotation extending in a longitudinal direction X-X. In this example, the shaft 4 is made in two portions: a proximal portion 4A and a distal portion 4B, the proximal portion being defined herein arbitrarily as being the portion closer to the braking system 3. For each portion 4A and 4B of the shaft, there is defined a respective proximal end 41A and 41B, and a respective distal end 42A and 42B, the proximal end of each portion being closer to the braking system 3.

The casing 1 as shown has a first internal volume that receives the hydraulic machine 2.

In this example, the hydraulic machine 2 is a hydraulic machine having radial pistons, comprising a distributor valve 21, a cylinder block 22 in which pistons 23 are arranged, the pistons being arranged facing a multi-lobe cam 24. In this example, the multi-lobe cam 24 is formed by a portion of the casing 1. The cylinder block 22 is mounted stationary relative to the shaft 4, such that these two elements 22 and 4 are constrained to rotate together, e.g. by means of fluting. The distributor valve 21 is positioned extending from the proximal end 41B of the distal portion 4B of the shaft 4.

In the embodiment shown, the hydraulic machine has a rotary shaft and a stationary cam. In a variant, the machine could have a rotary cam and a stationary shaft.

The structure of such a hydraulic machine is well known, and is not described in greater detail below.

In a variant, the hydraulic machine could have axial pistons.

The bearing 5 has two rolling bearing elements 51 and 52, specifically two conical roller bearings that are spaced from each other in the longitudinal direction of the shaft 4. The rolling bearing element 51 is thus referred to as the proximal rolling bearing element 51, while the rolling bearing element 52 is referred to as the distal rolling bearing 52. The spacing between the two rolling bearing elements 51 and 52 defines a second internal volume of the casing 1.

The braking system 3 comprises a plurality of brake disks 31 secured to the casing 1, and a plurality of brake disks 34 secured to the shaft 4, in particular via fluting or grooves. The brake disks 31 and 34 thus form a stack of brake disks.

The braking system 3 also has a brake control 7, configured so as to apply a compression force selectively against the brake disks 31 and 34 in order to control locking of relative rotary motion of the shaft 4 relative to the casing 1. The brake disks 31 and 34 are housed in a braking cavity formed between the shaft 4 (in this example the proximal portion 4A of the shaft 4) and the casing 1, the braking cavity thus presenting the general shape of a tube around the shaft 4, for example.

As shown, the braking control 7 is a piston that is movable in translation along the longitudinal direction X-X and it is adapted to exert a compression force on the stack of brake disks. The brake disks 31 and 34 then lead to relative rotary motion of the shaft 4 relative to the casing 1 becoming locked because of the friction forces between the brake disks 31 and 34.

The piston 7 is coupled to return means 71 tending to press the piston 7 against the stack of brake disks and thus tending to apply a braking force. In the example shown, the piston 7 is made up of two parts 7A and 7B, the part 7B serving to seal the braking system 3 while the part 7A comes into contact with the brake disks in order to apply a compression force against the stack of brake disks. The part 7B of the piston 7 thus comes into contact with the brake disks at a proximal end 6A of the braking cavity 6. Such a two-part structure is advantageous in particular for fabricating the piston 7, but it will readily be understood that the piston 7 could equally well be made as a single part, or could present any other structure enabling its described functions to be performed. In this example, the return means 71 are formed by two washers 71A and 71B mounted in succession between an abutment 17 of the casing and the part 7A of the piston 7. It can be understood that the structure of the return means 71 is adapted as a function of the shape of the system and of the nature of the washers selected; the embodiment shown with two washers is thus purely illustrative and not limiting, and the return means 71 could equally well be formed by a single Belleville washer, a spring, or any other appropriate means, for example.

The braking system 3 also has a brake-release chamber 8 having a feed orifice 81 that is typically connected to a pressure feed source (not shown in FIG. 1), e.g. a booster pump, as described below.

An increase in pressure within the brake-release chamber 8 exerts a brake-release force on the piston 7 against the force exerted by the return means 71. Thus, applying pressure within the brake-release chamber 8 enables the brake disks 31 and 34 to be disengaged and thus enables the shaft 4 to rotate relative to the casing 1 (or vice versa).

The system as described thus applies a braking force by default; it is necessary to apply a pressure within the brake-release chamber 8 in order to allow the shaft 4 and the casing 1 to rotate relative to each other.

It can thus be understood that, in operation, pressure is maintained within the brake-release chamber 8 in order to allow relative rotation between the shaft 4 and the casing 1.

The proposed system seeks to make use of this permanent pressure feed in operation in order to cause oil to flush through the inside of the internal volume of the casing 1 in which the hydraulic machine 2 is arranged.

Thus, in the proposed system, a flushing channel 9 is arranged in the shaft 4 so as to connect the brake-release chamber 8 to the first internal volume of the casing 1 in which the hydraulic machine 2 is arranged.

In the embodiment shown in FIG. 1, the flushing channel 9 extends in this example from a flushing cavity 90 formed extending from a distal end 6B of the braking cavity 6 containing the stack of brake disks 31 and 34, and is thus arranged on the side of the braking cavity 6 that is opposite from the side with the piston 7. In the example shown, the flushing cavity 90 is formed between the shaft 4 (specifically the proximal portion 4A of the shaft 4) and a portion of the casing 1 surrounding the distributor valve 21. This flushing cavity 90 leads into an internal cavity of the shaft 4 formed at the connection between the two portions 4A and 4B of the shaft 4. This internal cavity 43 is connected to the first internal volume of the casing 1 via boreholes or fluting typically arranged in the distal end 42A of the proximal portion 4A of the shaft 4 and/or in the proximal end 41B of the distal portion 4B of the shaft 4 and/or in a space between the distal portion 4B and the proximal portion 4A of the shaft 4.

The flushing channel 9 as shown has a radial portion 91 and an axial portion 92, which portions extend respectively radially and axially relative to the axis of rotation X-X. It can readily be understood that such a structure is not limiting, providing the flushing channel 9 enables the brake-release chamber 8 to be connected to the internal volume of the casing 1 in which the hydraulic machine 2 is arranged.

The flushing channel 9 thus serves to establish a flow of oil from the brake-release chamber to the first internal volume of the casing 1 in which the hydraulic machine 2 is arranged. Thus, in operation, a flow of oil is ensured through the first internal volume of the casing 1 in order to perform oil flushing, thereby lubricating and cooling the rotary elements of the hydraulic machine 2. As a result, the pressurized hydraulic fluid flows in a single direction from the brake-release chamber 8 to the internal volume of the casing 1 surrounded by the cylinder block 22 such that the leakage flow acts to flush the internal volume of the casing 1 surrounded by the cylinder block 22. An outlet orifice is typically arranged in the casing 1 in order to renew the oil.

The flushing channel 9 is typically provided with a constriction 93, shown in this example as being positioned at the end of the axial portion 92 of the flushing channel 9 where it leads into the internal cavity 43 of the shaft 4. This constriction 93 performs a head loss function, and thus imposes a pressure in the brake-release chamber 8 depending on the flow rate along the flushing channel 9. The constriction 93 is optionally calibrated so as to enable some minimum pressure to be established in the brake-release chamber in order to release the brake. The constriction 93 is typically formed by a component fitted in the flushing channel 9, or alternatively it is formed by at least one passage of calibrated section in the flushing channel 9.

The feed orifice 81 is then connected to a pressure source delivering a flow at the necessary rate thus enabling the brake-release chamber 8 to be put under pressure.

The proposed system thus makes it possible to make use of the oil used for controlling the brake system 3 in order to flush the associated hydraulic machine 2 with oil, thus making it possible to omit a dedicated hydraulic circuit, and in particular a dedicated admission orifice.

Figure 2:
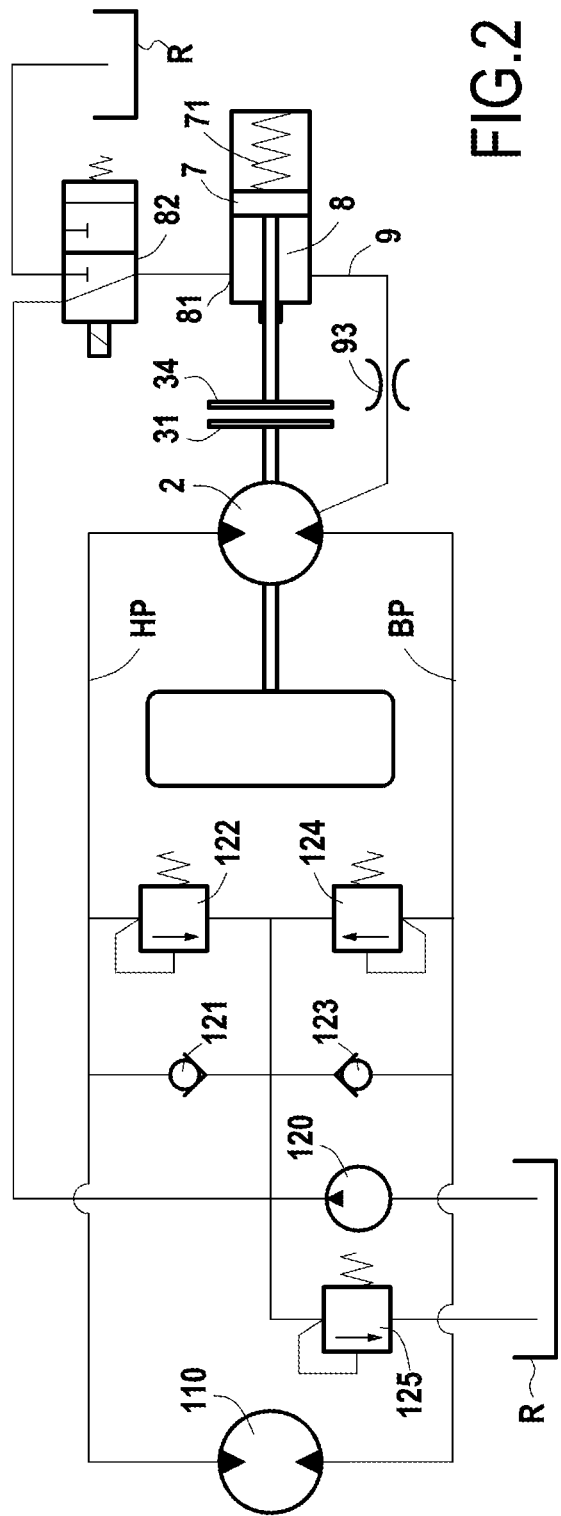
FIG. 2 is a hydraulic circuit diagram equivalent to the system shown in FIG. 1.

FIG. 2 is a hydraulic circuit diagram showing the principle on which the system shown in FIG. 1 operates in an application for a hydraulic motor driving a wheel in rotation.

This figure shows a hydraulic motor 2 driving a wheel, the hydraulic motor 2 corresponding to the above-described hydraulic machine 2, and in this example it is associated with a hydraulic pump 110. The hydraulic pump 110 and the hydraulic motor 2 form a hydraulic circuit presenting a high pressure line HP and a low pressure line BP that are connected respectively to the discharge and to the admission of the hydraulic pump 110. As shown, the hydraulic circuit also has a booster circuit comprising a booster pump 120 connected to the high pressure line HP via a check valve 121 and a pressure limiter 122, and to the low pressure line BP via a check valve 123 and a pressure limiter 124. The booster circuit is also connected to a tank at ambient pressure R via a pressure limiter 125 serving to avoid excess pressure within the booster circuit. The lines HP and BP are typically the high pressure and low pressure lines in forward operation while the wheel is driving. Nevertheless, when operating in reverse or when the wheel is being driven (going downhill), the pressures in the two lines may be inverted.

This figure also shows the braking system, comprising the brake disks 31 and 34 that are shown diagrammatically. The brake-release chamber 8 and the piston 7 are represented by an actuator having a thrust spring representing the effect of the return means 71. The feed orifice 81 of the brake-release chamber 8 is connected to the booster pump 120 via a valve 82 having three ports and two positions, serving to connect the brake-release chamber 8 selectively either to the booster pump 120 or to the tank R at ambient pressure.

Controlling the valve 82 thus serves to cause pressure to rise within the brake-release chamber 8, or on the contrary to purge the brake-release chamber 8 into the tank R.

The flushing channel 9 is also shown diagrammatically, provided with its constriction 93.

Figure 4:
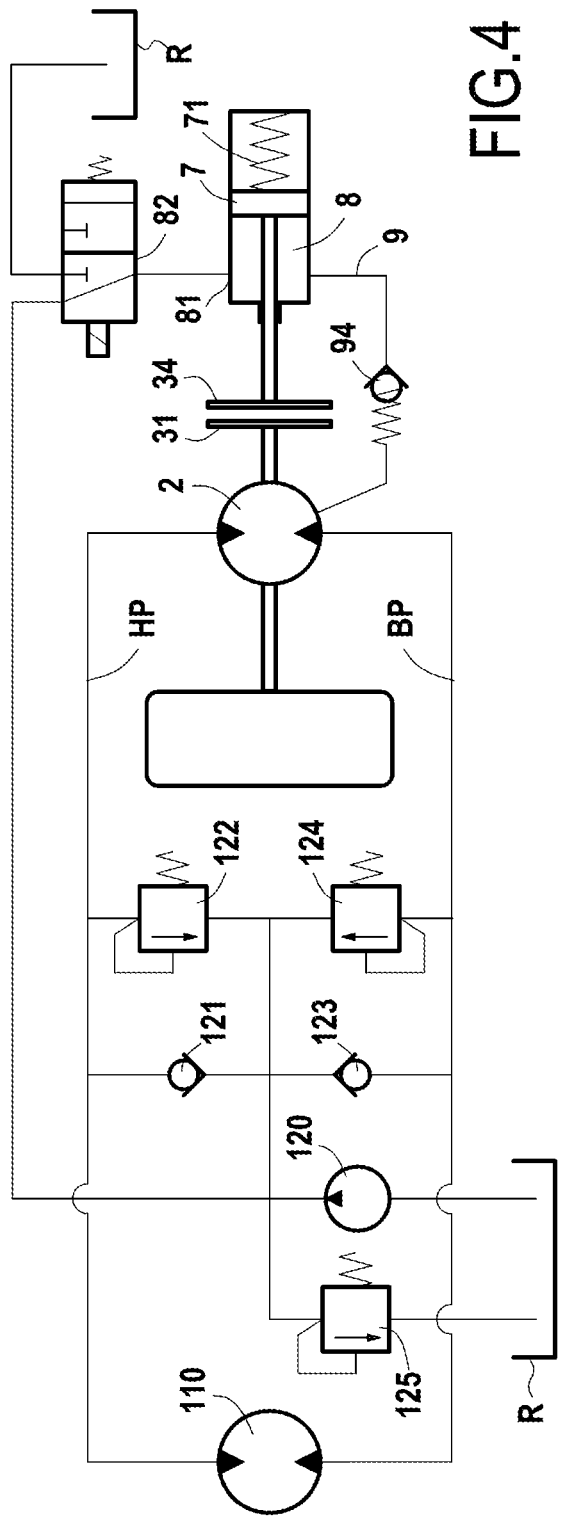
FIG. 4 is a hydraulic circuit diagram equivalent to the system shown in FIG. 3.
Figure 3:
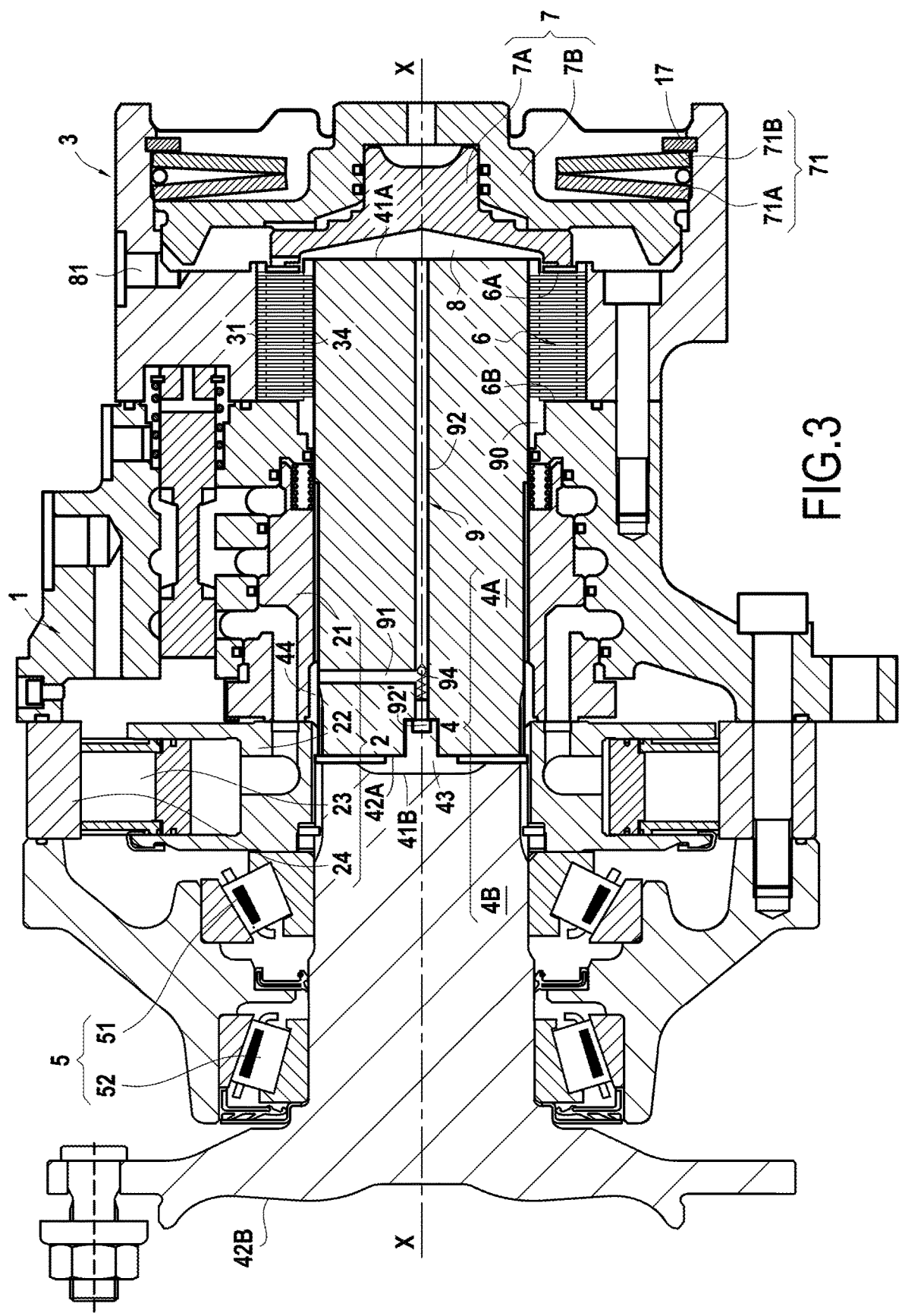
FIG. 3 shows a variant of the system shown in FIG. 1.

The flushing channel 9 may also be provided with a check valve, in order to ensure that fluid flows only from the brake-release chamber 8 towards the internal volume of the casing 1, as shown in FIGS. 3 and 4.

FIG. 3 shows a variant of the embodiment shown in FIG. 1.

This embodiment shown in FIG. 3 is similar to that described above with reference to FIG. 1. Nevertheless, the structure of the flushing channel 9 is different. In this embodiment, the flushing channel 9 has an axial portion 92 extending along the center of the proximal portion 4A of the shaft 4 from the brake-release chamber 8, and a radial portion 91 connecting the axial portion 92 to a bore formed in the distributor valve 21, thus forming a chamber 44 between the distributor valve 21 and the shaft 4, and leading into the internal volume of the casing 1 surrounded by the cylinder block 22. The axial portion 92 is blind, being closed at its end remote from the brake-release chamber 8. Specifically, it may be a through borehole having one end that opens into the brake-release chamber 8 and having its opposite end plugged by a plug 92'. The connection between the axial portion 92 and the radial portion 91 in this example is closed by a rated check valve 94 configured to allow flow from the brake-release chamber 8 towards the first internal volume of the casing 1 only when the pressure within the brake-release chamber 8 exceeds a pressure threshold value. It can be understood that a rated check valve can also be associated with the structure for the flushing channel 9 as described with reference to FIG. 1, and vice versa that a constriction may be arranged in the flushing channel 9 as shown in FIG. 3.

FIG. 4 is the hydraulic circuit diagram equivalent to the embodiment shown in FIG. 3. This figure is thus similar to FIG. 2, in which the constriction 93 arranged in the flushing channel 9 is replaced by a rated check valve 94.

In operation, pressure within the brake-release chamber 8 is raised in order to disengage the brake disks 31 and 34, as described above. Nevertheless, unlike the embodiment shown in FIGS. 1 and 2, the leakage flow from the brake-release chamber 8 to the first internal volume of the casing 1 becomes established only once the pressure within the brake-release chamber 8 has reached a rated threshold value, corresponding to the pressure value from which the rated check valve 94 passes from a closed position to an open position.

This rated threshold value is advantageously strictly greater than a first pressure threshold value corresponding to the pressure value within the brake-release chamber 8 from which the brake disks 31 and 34 become disengaged.

This ensures that the brake disks 31 and 34 are disengaged so as to allow the shaft 4 to rotate relative to the casing 1 prior to setting up a leakage flow from the brake-release chamber 8 to the first internal volume of the casing 1.

Such an embodiment is advantageous in that it enables brakes to be released manually, e.g. in order to tow or move equipment or a vehicle that is provided with such a system and that has failed. Specifically, for manual brake release, it can be understood that the pressure is raised within the brake-release chamber 8 more progressively than when a hydraulic pump is used to raise the pressure. It is thus advantageous to ensure initially that the brake disks 31 and 34 become disengaged and only then, once the rated threshold value has been reached, to deliver a flow of oil from the brake-release chamber 8 to the first internal chamber of the casing 1. It can also be understood that using a rated check valve makes it possible to keep the brake released without requiring pressure to be applied constantly from a pressure source, which is particularly advantageous for manual brake release and thus avoids the need for a user to apply pressure continuously in order to keep the brake released, e.g. as would happen when using a hand pump in the absence of a check valve rated to a value higher than the brake release pressure.

Furthermore, such a mode of operation makes it possible to avoid the brake disks 31 and 34 becoming engaged accidentally in the event of a failure of the pressure force feeding the brake-release chamber 8 once the brake-release pressure has become established therein.

With reference to the above-described embodiments, it can readily be understood that the present disclosure proposes providing the flushing channel 9 connecting the brake-release chamber 8 to the first internal volume of the casing 1 with an element that makes it possible to control and/or limit the flow rate passing from the brake-release chamber 8 to the first internal volume of the casing 1, in particular by generating sufficient head loss within the flushing channel 9. It can also be understood that the internal structures of the flushing channel 9 as described are not limiting and that any structure enabling the brake-release chamber 8 to be connected to the first internal volume of the casing 1 that contains the cylinder block 22 could be used, the flushing channel then being provided with an element serving to control and/or to limit the flow rate passing from the braking chamber 8 to the first internal volume of the casing 1, such as a constriction or a rated check valve.

Although the present invention is described with reference to specific embodiments, it is clear that modifications and changes may be undertaken to them without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive.

It is also clear that all of the characteristics described with reference to a method can be transposed singly or in combination to a device, and vice versa, all of the characteristics described with reference to a device can be transposed singly or in combination to a method.

The invention claimed is:

1. A hydraulic machine comprising: a casing rotatably mounted relative to a shaft; a cylinder block provided with a plurality of pistons arranged in an internal volume of the casing; first brake means constrained to rotate with the casing; second brake means constrained to rotate with the shaft, and adapted to co-operate with the first brake means; a braking piston adapted to act on the first brake means or the second brake means, said braking piston being associated with return means tending to exert a force on the braking piston that acts on the first and/or second brake means so as to put the first and second brake means into contact; and a brake-release chamber adapted to be connected to a pressure force so as to apply a brake-release pressure selectively to the braking piston, thereby tending to oppose the force applied by the return means on the braking piston, so as to enable the first and second brake means to be separated, wherein a feed orifice introduces pressurized hydraulic fluid into the hydraulic machine at the brake-release chamber; a flushing channel arranged within the shaft so as to define a leakage flow between the brake-release chamber and an internal volume of the casing surrounded by the cylinder block, wherein the pressurized hydraulic fluid flows from the brake-release chamber to the internal volume of the casing surrounded by the cylinder block such that the leakage flow acts to flush the internal volume of the casing surrounded by the cylinder block.

2. The hydraulic machine according to claim 1, wherein the flushing channel is provided with a constriction.

3. The hydraulic machine according to claim 1, wherein the flushing channel is provided with a check valve.

4. The hydraulic machine according to claim 3, wherein the return means are configured so that when a pressure within the brake-release chamber exceeds a first pressure threshold value, the first brake means and the second brake means are disengaged, and wherein said check valve is rated to a rating value that is greater than said first pressure threshold value.

5. The hydraulic machine according to claim 1, wherein the plurality of pistons of the cylinder block are arranged radially around an axis of rotation and arranged facing a multi-lobe cam.

6. The hydraulic machine according to claim 1, wherein the admission orifice is connected to a pressure source.

7. The hydraulic machine according to claim 1, wherein the shaft is made up of a proximal portion and a distal portion, and wherein the flushing channel leads into a flushing chamber arranged between the proximal portion and the distal portion of the shaft.

8. The hydraulic machine according to claim 1, wherein the flushing channel leads radially into a chamber formed between a distributor valve of the hydraulic machine and the shaft.

9. The hydraulic machine according to claim 1, wherein the flushing channel opens into the brake-release chamber at one end of the shaft.

10. The hydraulic machine according to claim 1, wherein the flushing channel opens out radially into the brake-release chamber in a flushing cavity formed at one end of the first and second brake means in an axial direction of the shaft.

* * * * *